Dec. 15, 1931.  H. C. FORBES  1,836,461
RADIO RECEIVING SYSTEM
Filed Dec. 26, 1925
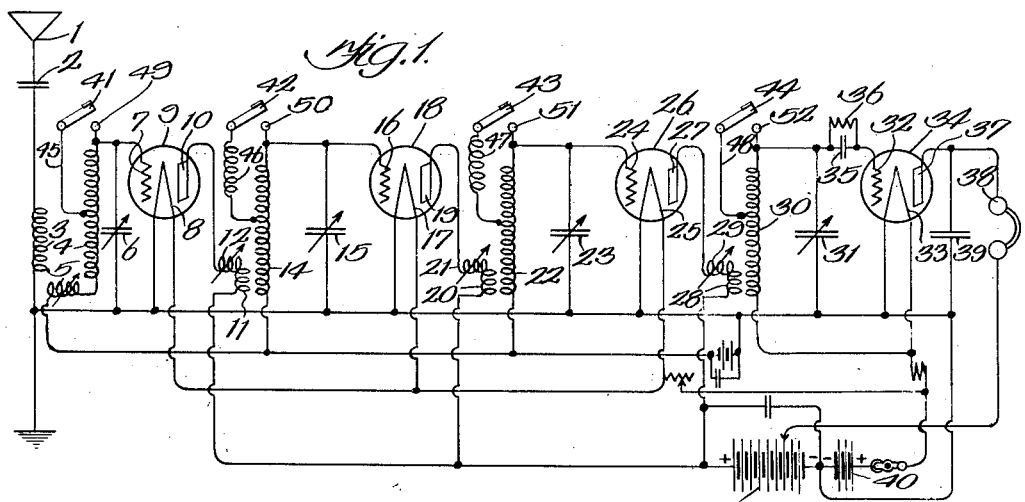
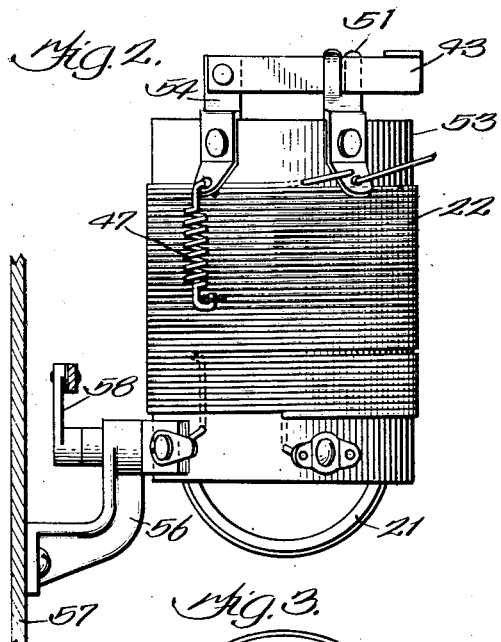
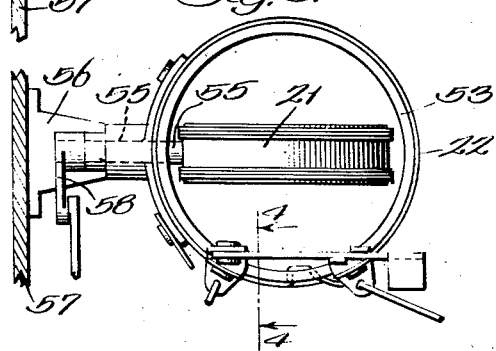
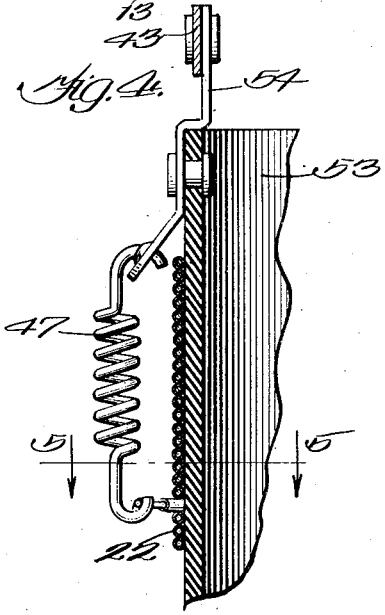
Inventor:
Henry C. Forbes.

Patented Dec. 15, 1931

1,836,461

UNITED STATES PATENT OFFICE

HENRY C. FORBES, OF CHICAGO, ILLINOIS, ASSIGNOR TO ZENITH RADIO CORPORATION, OF CHICAGO, ILLINOIS, A CORPORATION OF ILLINOIS

RADIO RECEIVING SYSTEM

Application filed December 26, 1925. Serial No. 77,834.

My invention relates to receiving sets employed in systems of radio communication and has for its general object an increase in the range of wave lengths to which a receiving set will satisfactorily respond.

In the present state of the art, radio receiving sets may readily be brought into tune when receiving waves varying in length from 200 meters to 600 meters, but these sets will not be satisfactorily operative when receiving waves below 200 meters in length, because the balance of the receiving circuit can not be maintained over so great a wave length range by the means commonly employed for adapting the receiving sets to varying wave lengths. For example, a receiving set which will be properly responsive to waves ranging from 200 meters to 600 meters in length would oscillate uncontrollably when receiving waves materially below 200 meters in length, it being necessary to maintain the balance as well as to merely adjust the instrument to altered wave lengths.

In the receiving set of my invention, means are employed whereby the balance of the receiving circuit may be maintained when receiving waves varying in length from below 100 meters up to, say, 600 meters in length. I accomplish this result by the provision of switches which, when opened, will permit the instrument properly to respond when subjected to waves varying in length from 200 meters to 600 meters and which, when closed, will enable the instrument properly to respond when receiving waves varying in length from 80 meters to 240 meters, the reception being secured in either adjustment with perfect stability. Each switch, when closed, serves to short circuit a portion of the secondary or current conducting coils of the corresponding tuning inductances in the corresponding grid or input circuit. The result is that loads are imposed on the receiving circuit, when the short circuits are established, which may be made of just the correct value to maintain the circuit in balance when receiving waves in the lower wave length band.

In the preferred embodiment of the invention, the short circuited portions of at least some of the transformer secondary coils include added resistances. These transformer coil portions, in addition to being short circuited, incidentally remain as conducting portions in the receiving circuits, in order that the desired loading may be furnished.

The invention will be more fully explained in connection with the accompanying drawings, in which Fig. 1 is a diagrammatic view illustrating a system of radio communication equipped in accordance with the preferred embodiment of the invention; Fig. 2 is a view of the preferred construction of the novel portions of my invention; Fig. 3 is a plan view of the structure shown in Fig. 2; Fig. 4 is a sectional view, on line 4—4 of Fig. 3; and Fig. 5 is a sectional view, on line 5—5 of Fig. 4.

Referring first more particularly to Fig. 1, I have there illustrated a high frequency receiving circuit in which my invention may be advantageously employed.

In the system illustrated in Fig. 1, radio frequency current traverses the aerial 1, the condenser 2, preferably used with long antennæ and not with short antennæ, and the coupler transformer grounded primary winding 3. The stationary secondary winding 4 of the vario coupler is in series with a rotatively adjustable winding 5. The variable secondary tuning condenser 6 is in shunt relation to the coils 4 and 5, taken together, being thus also traversed by radio frequency current. The elements 4, 5 and 6 are thus in a resonant circuit whose terminals are connected with the input electrode or grid 7 and the heating filament 8 of a radio frequency amplifying thermionic valve 9. Said valve also includes the output plate or electrode 10. The output circuit which includes this electrode also contains a stationary primary radio frequency transformer winding 11, a rotatively adjustable winding 12 in series with the winding 11, and the B battery 13 in series with both windings 11 and 12. The stationary radio frequency transformer secondary winding 14 is in inductive relation to the windings 11 and 12. The secondary 14 is shunted by a variable secondary tuning condenser 15.

There is thus a second resonant circuit in cascade relation to the first and whose terminals are connected with the input electrode or grid 16 and the heating filament 17 of a radio frequency amplifying thermionic valve 18. Said valve 18 also includes the output plate or electrode 19. The output circuit which includes this electrode 19 also contains a stationary primary radio frequency transformer winding 20, a rotatively adjustable winding 21 in series with the winding 20, and the aforesaid B battery. The stationary radio frequency transformer secondary winding 22 is in inductive relation to the windings 20 and 21. The secondary 22 is shunted by a variable secondary tuning condenser 23.

There is thus a third resonant circuit in cascade relation to the other two and whose terminals are connected with the input electrode or grid 24 and the heating filament 25 of a radio frequency amplifying thermionic valve 26. Said valve 26 also includes the output plate or electrode 27. The output circuit which includes this electrode 27 also contains a stationary primary radio frequency transformer winding 28, a rotatively adjustable winding 29 in series with the winding 28, and the B battery 13. The stationary radio frequency transformer secondary winding 30 is in inductive relation to the windings 28 and 29. The secondary 30 is shunted by a variable secondary tuning condenser 31.

There is thus a fourth resonant circuit in cascade relation to the other three and whose terminals are connected with the input electrode or grid 32 and the heating filament 33 of a thermostat detector valve 34, this resonant circuit being connected with the grid 32 by way of the usual condenser 35 and the high resistance leakage path 36 in shunt to this condenser. Said valve 34 also includes the output plate or electrode 37. The output circuit which includes this electrode 37 supplies the telephone receiver 38 with audio frequency current, the output circuit containing the electrode 37 and receiver 38 also containing a portion of the B battery. The telephone receiver is shunted by the usual by-pass condenser 39. The A battery 40 supplies the filaments 8, 17, 25 and 33 with current, as illustrated.

I have shown a cascade of four radio frequency tuning circuits, but the invention may be practiced with one radio frequency tuning circuit. All of the adjustable elements, hitherto described, of the receiving circuit, may, if desired, be simultaneously regulated by unitary adjusting means in accordance with well-known practice.

I have employed short circuiting switches 41, 42, 43 and 44 respectively individual to the transformer secondaries 4, 14, 22 and 30, These switches are connected by means of taps 45, 46, 47, and 48 with selected portions, say, the mid portions, of the secondaries, respectively. Contacts 49, 50, 51 and 52 are connected respectively with one end of each of said transformer secondaries so that, when the switches are closed, the selected portions of the transformer secondaries are short circuited. When the switches are opened, the receiving set will properly respond to waves of, say, 200 meters to 600 meters in length. When the switches are closed, the receiving circuit will be so loaded as to respond, say, to waves of from 80 meters to 240 meters in length, the circuit being perfectly stable with either adjustment of the short circuit switches. I have found that the short circuiting taps 45 and 48 may be of negligible ohmic resistance. The taps 46 and 47 may include slightly larger ohmic resistance. When the selected portions of the transformer secondary coils are short circuited, they incidentally remain as conducting portions of the receiving circuit, being supplemented in this function by the short circuiting paths which cause these coils to be in secondary relation with the unshort circuited portions of these coils in order to furnish the desired loading. Each radio frequency transformer secondary is thus equipped with a local circuit that is exclusive of the corresponding valve and inclusive of a serial part only of such secondary and a switch for opening and closing the local circuit.

The physical construction and arrangement of the transformer secondaries and the short circuiting switches pertaining thereto are illustrated in Figs. 2 to 5, inclusive. In these figures, the structure and arrangement of the transformer secondary 22 or 30 and the associated short circuiting means are illustrated, the reference numerals pertaining to the transformer secondary 22, the short circuiting tap 47 and the switch elements 43 and 51 being employed in Figs. 2 to 5, inclusive.

The mechanical arrangement illustrated is inclusive of a cylindrical shell 53 about which the winding 22 is disposed. The switch arm 43 is pivoted upon a bracket 54 carried by the shell 53. The contact 51 is split and is also carried upon said shell, the switch arm 43 being receivable between the split portions of the contact when the switch is closed. The short circuiting tap 47 includes slight ohmic resistance as shown. The shaft 55, which carries the rotatively adjustable coil 21, is journaled in the bracket 56 which is mounted upon the panel board 57. The coil 21 is mounted within the bore of the shell 53, being adapted to be turned to vary the angularity of its axis with respect to the axis of the coil 22. This shaft is preferably connected by linkage 58 with the shafts of the other rotatively adjustable coils 5, 12 and 29 and with the shafts of the rotors of the several condensers 6, 15, 23, and 31. The short circuiting means employed in conjunction with the transformer secondary 14 is preferably identical with that shown in Figs. 2 to 5 inclusive. The short circuiting means employed in conjunction with the transformer secondaries 4 and 30 is preferably identical with that shown in Figs. 2 to 5 inclusive except that the taps 45 and 48 are desirably of negligible ohmic resistance.

Changes may be made without departing from the invention.

Having thus described my invention, I claim:

1. A radio receiving system including a primary radio frequency transformer winding; a winding in secondary relation to the aforesaid winding; a thermionic valve having an input circuit supplied from the second aforesaid winding; variable capacity means for tuning said input circuit to the signal frequency; and a local circuit exclusive of said valve, comprising a serial part of the second aforesaid winding, a resistance element, and a switch for opening and closing said local circuit.

2. A radio receiving system including an air-core transformer, primary and secondary windings comprised in said transformer, variable capacity means for tuning said secondary winding to the signal frequency, and a local circuit connected to bridge a plurality of the turns of said secondary winding; said local circuit including a resistance element and a switch for opening and closing said local circuit.

3. A radio receiving system including a transformer, a variable primary coil and a secondary coil comprised in said transformer, variable capacity means adjustable to tune said secondary coil to the signal frequency, and means operable at will to vary the inductive value of said secondary coil, comprising a resistance element and a switch operable to connect and disconnect said resistance element in parallel circuit with a plurality of the turns of said secondary coil.

4. In a radio receiving system, a transformer having a variometer primary winding and a secondary winding, said primary winding being variocoupled to said secondary winding, variable capacity means for tuning said secondary winding to the signal frequency, and a local resistance circuit connectible at will to include a portion of said secondary winding.

5. In a radio receiving system, a transformer having a variometer primary winding and a tapped secondary winding, said primary winding being variocoupled to said secondary winding, variable capacity means for tuning said secondary winding to the signal frequency, a bypass circuit connected with two of the taps of said secondary winding, a resistance element in said bypass circuit, and a switch operable to open and close said bypass circuit.

6. In a radio receiving system, the combination, with a radio frequency transformer secondary winding and variable capacity means for tuning said secondary winding to the signal frequency, of a local induction circuit connectible at will to include one portion of said winding, the inductive effect of said local circuit when connected operating to increase the radio frequency resistance of another portion of said winding for higher frequencies.

7. In a radio receiving system, the combination, with a radio frequency transformer secondary winding and variable capacity means for tuning said secondary winding to the signal frequency, of a local absorption cicuit connectible at will to include one portion of said winding, the absorption effect of said local circuit when connected operating to stabilize the effectiveness of another portion of said winding at higher frequencies.

In witness whereof, I hereunto subscribe my name.

HENRY C. FORBES.